United States Patent
Arora et al.

(10) Patent No.: US 7,089,516 B2
(45) Date of Patent: Aug. 8, 2006

(54) MEASUREMENT OF INTEGRATED CIRCUIT INTERCONNECT PROCESS PARAMETERS

(75) Inventors: Narain D. Arora, San Jose, CA (US); Li J. Song, Fremont, CA (US); Aki Fujimura, Saratoga, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 191 days.

(21) Appl. No.: 10/806,680

(22) Filed: Mar. 22, 2004

(65) Prior Publication Data

US 2005/0206394 A1 Sep. 22, 2005

(51) Int. Cl.
*G06F 17/50* (2006.01)
(52) U.S. Cl. .............................................. 716/4; 716/5
(58) Field of Classification Search .................... 716/4, 716/5; 324/765
See application file for complete search history.

(56) References Cited

U.S. PATENT DOCUMENTS

| | | | |
|---|---|---|---|
| 5,999,010 A | 12/1999 | Arora et al. ................. | 324/765 |
| 6,291,254 B1 | 9/2001 | Chou .......................... | 438/18 |
| 6,312,963 B1 | 11/2001 | Chou .......................... | 438/18 |
| 6,424,141 B1 * | 7/2002 | Hollman et al. .......... | 324/158.1 |
| 6,430,729 B1 * | 8/2002 | Dewey et al. ................. | 716/4 |

OTHER PUBLICATIONS

Kunikiyo et al., "Non-Destructive Inverse Modeling of Copper Interconnect Structure for 90 nm Technology Node", Sep. 2003, IEEE International Conference on Simulation Semiconductor Processes and Device, Paper Digest pp. 31-34.*

Agilent 4284 A Precision LCR Meter, Data Sheet, 2002, Agilent Technologies, Inc.*

N.D Arora, L. Song, S. Shah, K. Joshi, K. Thumaty, A. Fujimura, J.P. Schoelkopf, H. Brut, M. Smayling, T. Nagata; Cadence Design Systems, San Jose, CA 95135; STMicroelectronics, Crolles, France, 38926; Applied Materials, Santa Clara, CA 95054; Test Chip Characterization Of X Architecture Diagonal Lines For Soc Design; 5 pages.

(Continued)

*Primary Examiner*—Sun James Lin
(74) *Attorney, Agent, or Firm*—Orrick Herrington & Sutcliffe, LLP

(57) ABSTRACT

The present invention relates to techniques for measuring integrated circuit interconnect process parameters. The techniques are applicable to any non-ideally shaped interconnects made from any type of conductive materials. Test structures are fabricated within an integrated circuit. Non-destructive electrical measurements are taken from the test structures to determine coupling capacitances associated with the test structures. A field solver uses the initial process parameters to determine design coupling capacitances. An optimizer then uses the measured coupling capacitances and the design coupling capacitances to determine the interconnect process parameters.

31 Claims, 5 Drawing Sheets

OTHER PUBLICATIONS

Narain D. Arora; Cadence Design Systems, Inc., San Jose, CA 95134, USA; Modeling And Characterization Of Copper Interconnects For Soc Design; 6 pages.

Dae-Hyung Cho, Man-Ho Seung, Nam-Ho Kim, and Hun-Sup Park; Measurement And Characterization of Multi-Layered Interconnect Capacitance For Deep Submicron Vlsi Technology; 4 pages; Proc. IEEE 1997 Int. Conference on Microelectronic Test Structures, vol. 10, Mar. 1997.

James C. Chen, Dennis Sylvester, and Chenming Hu; An On-Chip, Interconnect Capacitance Characterization Method With Sub-Femto-Farad Resolution; 7 pages; vol. 11, No. 2, May 1998.

Narain D. Arora and Li Song; Atto-Farad Measurement And Modeling Of On-Chip Coupling Capacitance; 1 of 3 pages; IEEE Electron Device Letters, IEEE Transactions on Semiconductor Manufacturing, vol. 25 No. 2, Feb. 2004.

* cited by examiner

MEASUREMENT OF INTEGRATED CIRCUIT INTERCONNECT PROCESS PARAMETERS

FIELD OF THE INVENTION

The present invention relates to integrated circuit design and manufacturing and more particularly to the measurement of interconnect process parameters in integrated circuits.

BACKGROUND

An integrated circuit is a collection of electronic components (e.g., transistors) fabricated within a semiconductor device or chip. A single integrated circuit can contain millions of electronic components. Conductive lines connect the electronic components within the semiconductor devices to one another. These conductive lines are often referred to as "interconnect lines" or the "interconnect." By connecting the electronic components to one another in a specific manner via the interconnect, the semiconductor devices can send signals to one another, thereby allowing the integrated circuit to perform different functions. For example, some integrated circuits can be designed to function as microprocessors and other integrated circuits can be designed to operate as memory.

Integrated circuits are designed using software design tools. It is very important that the design tools accurately model the physical characteristics of the electronic components and the interconnect. Accurate physical modeling using the software design tools increases the chances that a particular design will work properly the first time it is fabricated. Likewise, if a particular design is not modeled correctly, it is very likely that the design will not function properly when fabricated. In this situation, an integrated circuit designer must then attempt to determine why the design failed, make changes to the design, and fabricate another chip using the modified design. This iterative process significantly delays the time it takes to get the semiconductor product to market, causing companies to lose money and market share. In addition, the need to refabricate integrated circuit chips can lead to dramatically increased costs since the actual fabrication process is very expensive. It is therefore essential that the electronic components and the interconnects that connect these components are modeled accurately during the design phase of the integrated circuit chip.

To create accurate models of integrated circuit interconnects, integrated circuit designers must analyze fabricated semiconductor wafers to determine physical (actual) interconnect process parameters. Important process parameters include line width, metal thickness, and dielectric thickness. There are several known techniques that can be used to measure the actual interconnect process parameters. One commonly used measurement technique uses a destructive methodology, where a focused ion beam ("FIB") cuts into a fabricated wafer exposing the cross section of an interconnect line and then a Scanning Electron Microscope ("SEM") takes pictures of the exposed interconnect line. Unfortunately, this technique destroys the wafer. It also takes a relatively long period of time to make the measurements since the wafer must be cut and then analyzed using a microscope.

Non-destructive techniques can also be used to measure physical interconnect process parameters. One non-destructive technique uses optical metrology tools. Wafers are not damaged using this technique. The optical metrology tools make measurements quickly and the results can be easily interpreted. However, the resolution of current generation optical metrology tools limits their applications to sub-micron range (i.e., less than 100 nm).

In recent years, aggressive scaling of semiconductor process technologies has resulted in interconnect delays that have become larger than transistor gate delays. To address this problem, the semiconductor industry has began using copper as the interconnect material, rather than aluminum. This is because the signal delay through a copper interconnect is less than the signal delay through a aluminum interconnect. Due to low resistivity of copper, which is almost half of that of Aluminum, both the resistance and capacitance of the interconnect are reduced, resulting in a lower interconnect delay.

A disadvantage to using copper interconnects compared to aluminum interconnects is that it is more difficult to measure the process parameters of copper interconnects. It is well known that aluminum interconnect lines have a rectangular shape after processing, while copper interconnect lines have a trapezoidal shape after processing. However, most conventional measurement techniques are only capable of measuring the process parameters for interconnect lines having rectangular shapes. In fact, the only known technique for accurately measuring copper interconnect process parameters is the destructive SEM technique described above. As discussed above, obtaining measurements using the destructive SEM technique is time consuming, and results in the destruction of wafers. Non-destructive optical and e-beam tools cannot give information on both width (top and bottom) and thickness of the copper interconnects, because these techniques are only capable of measuring top view of the interconnects. It is essential to capture all three dimensions associated with copper interconnects for process control, parasitic extraction, circuit delay simulation, and parametric yield prediction.

Thus, given advances in semiconductor fabrication technologies, and in particular, the use of copper interconnects, there is a need for non-destructive techniques to determine the process parameters for interconnects having non-ideal (i.e., non-rectangular) shapes.

SUMMARY

The various embodiments described herein provide techniques that allow the process parameters for interconnects having non-rectangular shapes (e.g., copper interconnects) to be determined. Test structures that include a pair of substantially symmetrical fingers located between two conductive plates are fabricated within an integrated circuit. Simple electrical measurements of the test structures are taken and used to determine measured coupling capacitances associated with the test structures. These electrical measurements can be made using passive or active techniques. Independently, a field solver calculates initial coupling capacitances from initial process parameters. Optimization techniques are then used to determine the physical process parameters based on the field solver calculations and the measured coupling capacitances.

The above and other features of the invention, including various novel details of implementation and combination of elements will now be more particularly described with reference to the accompanying drawings and pointed out in the claims. It will be understood that the particular methods and circuits embodying the invention are shown by way of illustration only and not as limitations. As will be understood by those skilled in the art, the principles and features of this invention may be employed in various and numerous embodiments without departing from the scope of the invention.

BRIEF DESCRIPTION OF THE DRAWINGS

Reference is made to the accompanying drawings in which are shown illustrative embodiments of aspects of the invention, from which novel features and advantages will be apparent.

DETAILED DESCRIPTION

System Overview

The various embodiments disclosed herein provide non-destructive techniques for measuring interconnect process parameters. The various embodiments are especially useful for measuring the process parameters of interconnects having non-rectangular shapes, such as copper interconnects.

Figure 1:
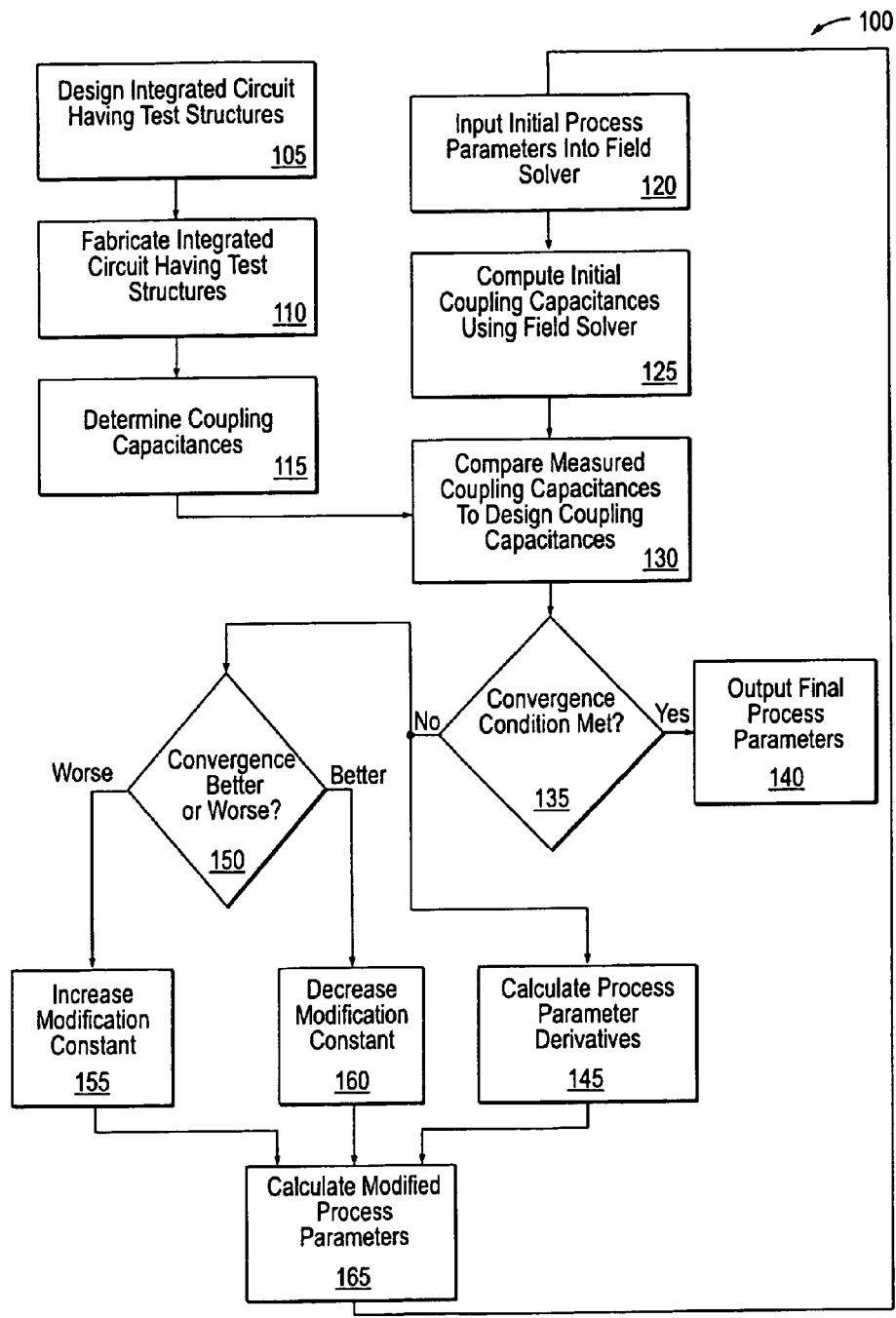
FIG. 1 is a flowchart that describes an interconnect measurement process according to embodiments disclosed herein.

FIG. 1 is a flowchart 100 that describes an interconnect measurement process. In step 105, an integrated circuit having test structures is designed according to design parameters that are known for the particular fabrication facility that will be used to manufacture this integrated circuit. The design parameters typically include the width of the interconnect, which is the same at the top and bottom of the interconnect line at the design stage. As will be discussed, the test structures include two sets of substantially symmetrical conductors disposed between a top plate and a bottom plate (see FIGS. 2–4). In step 110, the integrated circuit having the test structures is fabricated. In step 115, three coupling capacitances are determined: (1) the coupling capacitance between the first set of conductors and the second set of conductors; (2) the coupling capacitance between one of the sets of conductors and the top plate; and (3) the coupling capacitance between one of the set of conductors and the bottom plate.

In step 120, initial process parameters are input into a field solver or another mathematical tool that is capable of determining coupling capacitances from the initial process parameters. The initial process parameters typically include the conductor thickness and width, assumed to be the same at the top and bottom, and the thickness of the dielectric between different conductors. In step 125, the field solver computes initial coupling capacitances. In step 130, the initial coupling capacitances are compared to the measured coupling capacitances. In step 135, the system determines whether the two sets of coupling capacitances meet a convergence condition. The convergence condition is met when the values of the two sets of coupling capacitances are close to one another or do not change significantly from iteration-to-iteration. In one embodiment, the convergence condition is met if the two sets of coupling capacitances are within 1% of one another.

If the two sets of coupling capacitances meet the convergence condition, the system determines that the physical (actual) process parameters are equivalent to the initial process parameters. The system then outputs final process parameters (step 140), which are equivalent to the initial process parameters. In the case of interconnections having non-ideal shapes (e.g., copper interconnects), the two sets of coupling capacitances will not initially meet the convergence condition. For example, in the case of copper interconnects the initial coupling capacitances and the measured coupling capacitances may be as much as 10–20% different. This is because the initial process parameters assume that width of the top and bottom portions of the interconnect are the same, but the fabricated copper interconnect actually has a trapazoidal shape.

If the two sets of coupling capacitances do not meet the convergence condition, the system calculates process parameter derivatives (step 145) and determines whether convergence is getting better or worse from the previous measurements (step 150). If convergence is worsening, a modification constant is increased (step 155). If convergence is improving, the modification constant is decreased (step 160). The modification constant is a constant value that can be multiplied with the process parameter derivatives. Larger modification constants can be used when the system is not close to converging, and smaller modification constants can be used when the system is close to converging.

In step 165, modified process parameters are calculated based on the process parameter derivatives and the modification constant. The modified process parameters are then input into the field solver (step 120) and the iterative process continues until convergence occurs. Once convergence occurs, the system determines the physical (actual) process parameters are equivalent to the current set of modified process parameters.

Test Structures

Figure 2A:
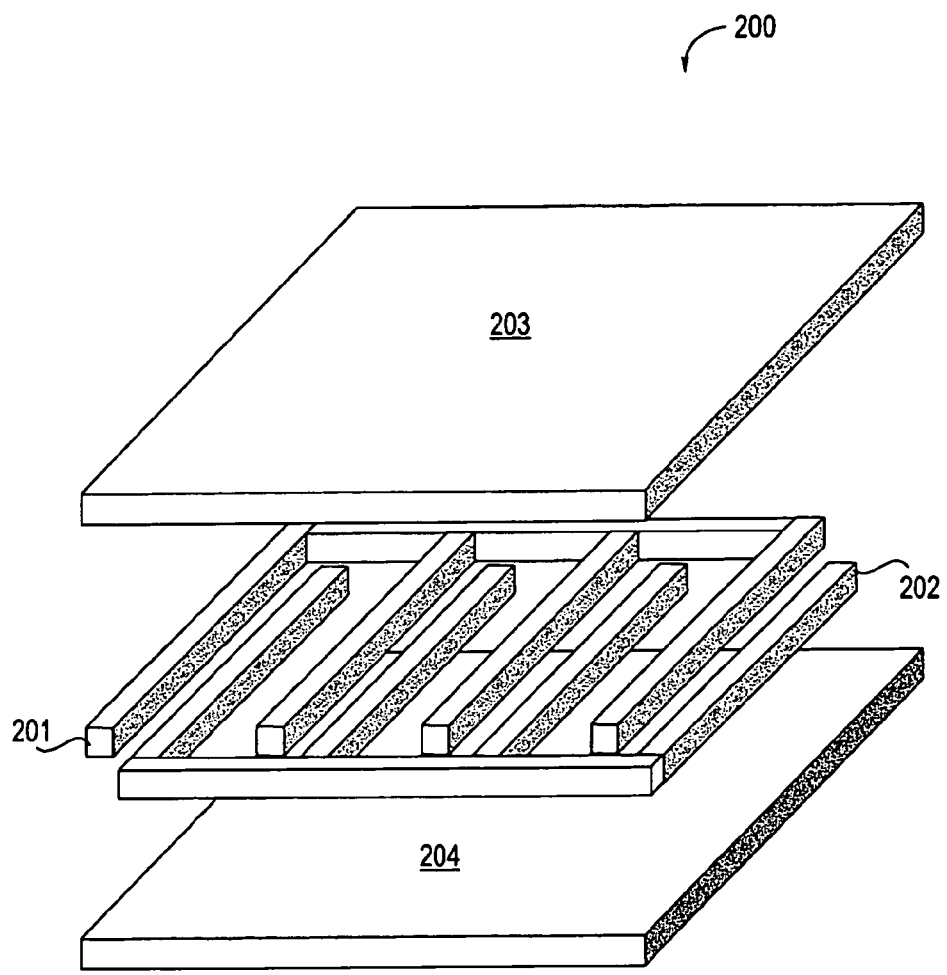
FIG. 2A shows a perspective view of a test structure according to embodiments disclosed herein.

FIG. 2A shows a perspective view of an exemplary test structure 200 that can be fabricated within an integrated circuit and/or wafer. Test structure 200 includes a pair of substantially symmetrical fingers (or wires) 201 and 202, a top plate 203 and a bottom plate 204. Fingers 201 and 202 are disposed between top plate 203 and bottom plate 204. Fingers 201 and 202, top plate 203 and bottom plate 204 can be made of any conductive material such as copper. Top plate 203 and bottom plate 204 can be solid plates, slotted plates, or plates that consist of a series of parallel lines spaced very closely together. Fingers 201 and 202 are electrically isolated from one another and from top and bottom plates 203, 204 via a dielectric material (not shown).

Note that although the test structure 200 is shown with fingers 201 and 202 having a comb shape, it should be recognized that the a variety of other shapes can be used such as a maze or serpentine shape. The length of fingers 201 and 202 and the number of fingers 201 and 202 should be designed so that undesirable parasitic capacitance effects are minimized and so that certain coupling capacitances can be calculated accurately by a field solver (described below). The width and spacing of fingers 201 and 202 can be selected according to design rules and certain design of experiment points at which the process parameters are obtained.

Figure 2B:
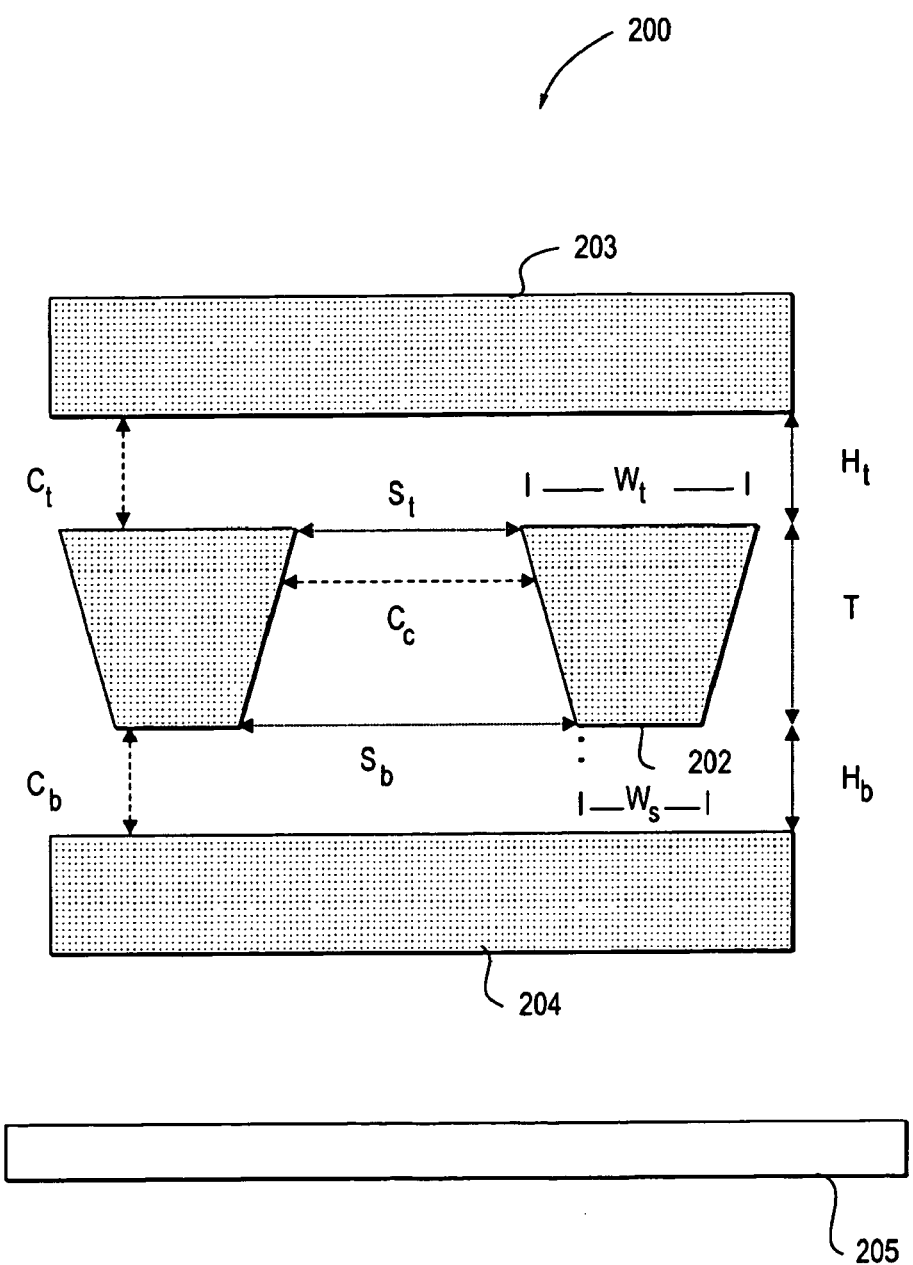
FIG. 2B shows a cross-sectional view of a portion of test structure according to embodiments disclosed herein.

FIG. 2B shows a cross-sectional view of exemplary test structure 200. The thickness of fingers 201 and 202 is shown as T. The spacing between the top surface of finger 201 and the top surface of finger 202 is shown as St. The spacing between the bottom surface of finger 201 and the bottom surface of finger 202 is shown as Sb. The width of the top surface of finger 201 and/or 202 is shown as Wt. The width of the bottom surface of finger 201 and/or 202 is shown as Wb. The distance between finger 201 and/or 202 and top plate 203 is shown as Ht. The distance between finger 201 and/or 202 and bottom plate 204 is shown as Hb.

There are three coupling capacitances associated with test structure 200: Ct, Cb, and Cc. Ct is the coupling capacitance between finger 201 or finger 202 and top plate 203. Cb is the coupling capacitance between finger 201 or finger 202 and bottom plate 204. Cc is the coupling capacitance between finger 201 and finger 202. The values of coupling capacitances Cc, Ct and Cb are dependent on the process parameters of the interconnect.

A typical integrated circuit design will typically have interconnect lines having various line widths and line spacings. Each line having a different width and/or spacing will have its own unique process parameters. It should therefore be recognized that test structures corresponding to each of these different lines can be fabricated within the integrated circuit. Each of these test structures will have their own unique process parameters that can be measured according to the present invention.

Determination of Coupling Capacitances

Figure 3:
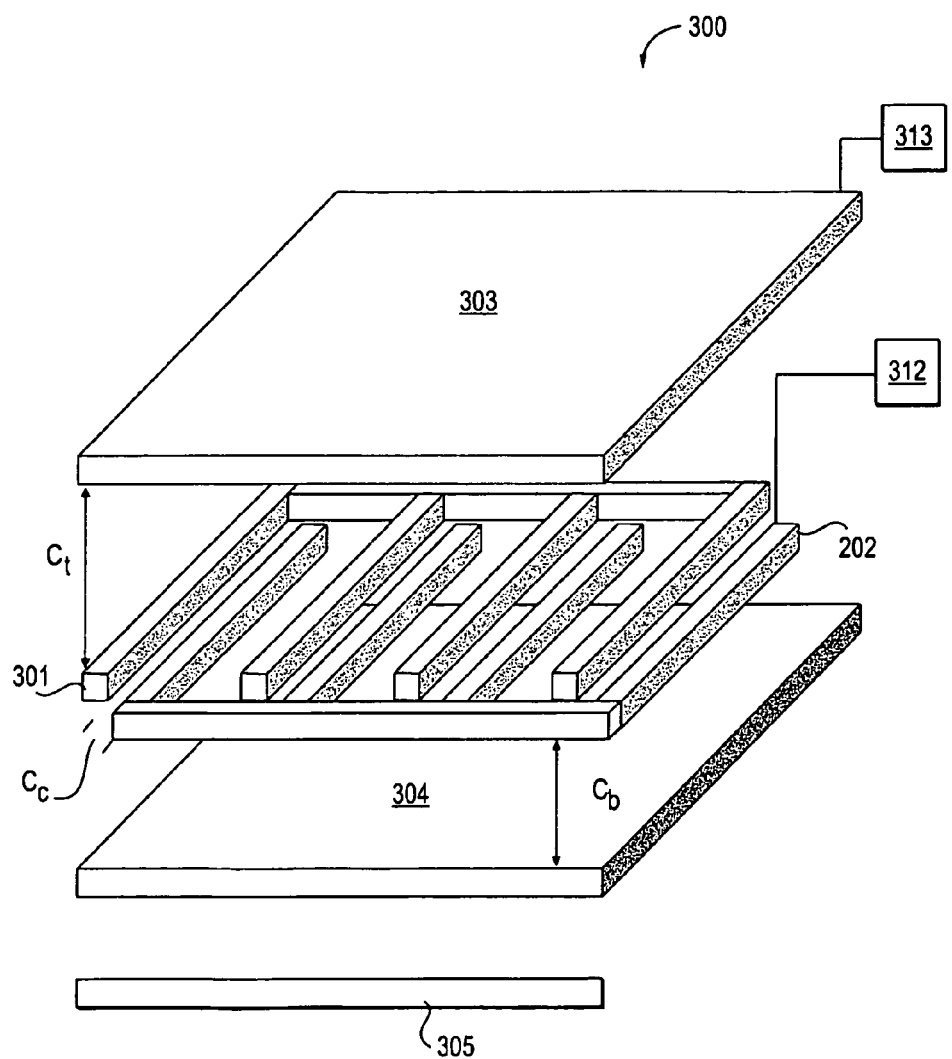
FIG. 3 shows a test structure whose coupling capacitances Ct, Cb and Cc can be measured using a passive measurement technique according to embodiments disclosed herein.

The values of coupling capacitances Ct, Cb and Cc can be determined using any suitable passive or active capacitance measurement technique. FIG. 3 shows a test structure 300 whose coupling capacitances Ct, Cb and Cc can be determined using an LCR meter (a passive measurement technique). Test structure 300 includes fingers 301 and 302, a top plate 303, and a bottom plate 304. Probe pads 311, 312, 313, and 314 are fabricated into the integrated circuit and placed in electrical communication with fingers 301 and 302, top plate 303, and bottom plate 304, respectively.

To determine the coupling capacitances Ct, Cb and Cc, an LCR meter is first used to measure seven capacitances C1, C2, C3, C4, C5, C6, and C7. Capacitance C1 is the total capacitance of finger 301, which includes the coupling capacitance to finger 302, the coupling capacitance with respect to the top plate 303 and bottom plate 304, in addition to the parasitic capacitance to ground 305. C2 is the total capacitance of finger 302, which includes the coupling capacitance to finger 301, the coupling capacitance with respect to the top plate 303 and bottom plate 304, in addition to the parasitic capacitance to ground 305. C3 is the total capacitance of the structure, consisting of fingers 301 and 302 connected together, with respect to top plate 303 and bottom plate 304, in addition to the parasitic capacitance of the structure (fingers 301 and 302 connected together) to ground 305. C4 is the total capacitance of bottom plate 304, which includes the coupling capacitance to finger 301, the coupling capacitance with respect to finger 302 and top plate 303, in addition to the parasitic capacitance of the structure to ground 305. C5 is the coupling capacitance of the structure, consisting of finger 301 and bottom plate 304 connected together, with respect to finger 302 and top plate 303, in addition to the parasitic capacitance of the structure (finger 301 and plate 304 connected together) to ground 305. C6 is the total capacitance of top plate 303, which includes the coupling capacitance to 301, the coupling capacitance with respect to finger 302 and bottom plate 304, in addition to the parasitic capacitance to ground 305. C7 is the total capacitance of the structure, consisting of finger 301 and top plate 303 connected together, with respect to finger 302 and bottom plate 304, in addition to the parasitic capacitance of the structure (finger 301 and plate 303 connected together) to ground 305. Those of ordinary skill in the art will recognize how to measure C1, C2, C3, C4, C5, C6, and C7 using an LCR meter. The measurement technique is also discussed with reference to FIG. 4 below.

Once capacitances C1, C2, C3, C4, C5, C6, and C7 have been measured, coupling capacitances Ct, Cb and Cc are then calculated using the following equations:

$$Ct=(C1+C4-C5)/2 \quad \text{Equation 1}$$

$$Cb=(C1+C6-C7)/2 \quad \text{Equation 2}$$

$$Cc=(C1+C2-C3)/2 \quad \text{Equation 3}$$

Because the probing pads and the connections from the probing pads to the plates and fingers introduce parasitic capacitances, a reference structure (not shown) can be fabricated and measured so that parasitic capacitances can be determined. The reference structure is similar to test structure 300 except that it does not include fingers 301 and 302. Therefore, the reference structure will include a first pad and a connection from the first pad to the top plate, a second pad and a connection from the second pad to the bottom plate, a third pad and a connection from the third pad to the area where the first finger would be located, and a fourth pad and a connection from the fourth pad to the area where the second finger would be located.

Figure 4:
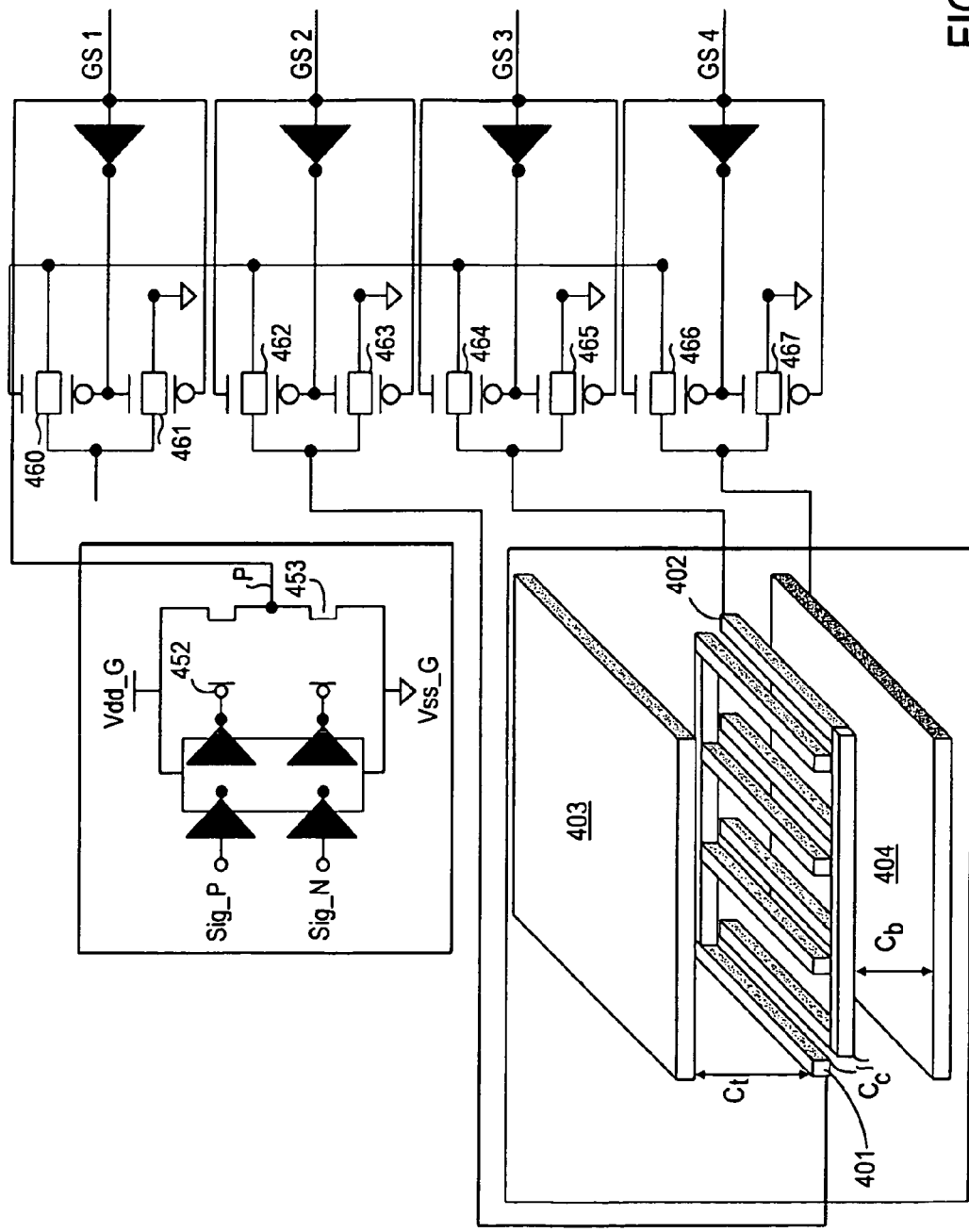
FIG. 4 shows a test structure whose coupling capacitances Ct, Cb and Cc can be measured using an active measurement technique according to embodiments disclosed herein.

FIG. 4 shows a test structure 400 whose coupling capacitances Ct, Cb and Cc can be measured using an active measurement technique according to some embodiments of the present invention. Active measurement techniques are similar to passive measurement techniques except that some of the measurement circuitry is fabricated on the integrated circuit. Active measurement techniques are generally more accurate than passive measurement techniques and therefore should be used when the coupling capacitances are in the atto-Farad.

Test structure 400 is in electrical communication with a charge-based capacitance measurement (CBCM) circuit 451 and multiplexer circuits 460–467. Measurement of coupling capacitances using the CBCM method is described in more detail in "An On-Chip, Interconnect Capacitance Characterization Method with Sub-Femto-Farad Resolution," IEEE Transactions On Semiconductor Manufacturing, Vol. 11, No. 2, 204–210 (May 1998).

Referring to FIG. 4, an external dual pulse generator such as an HP8110A can be connected to the Sig_P and Sig_N inputs of P device 452 and N device 453, respectively, through a two-stage buffer. The non-overlapping waveforms of the dual pulse generator guarantee that, except for the leakage, there is no current path between Vdd and Vss (ground). The total capacitance at point P is given by the following equation:

$$C=Iavg/(Vdd \times f) \quad \text{Equation 4}$$

where Iavg the current that flows from Vdd to Vss (ground), Vdd is the applied voltage, and f is frequency of the pulses. Iavg can be measured using a current meter connected in series with Vdd.

To determine the coupling capacitances Ct, Cb and Cc, CBCM circuit 451 and multiplexer circuits 460–467 are first used to measure seven capacitances C1, C2, C3, C4, C5, C6, and C7. Capacitances C1, C2, C3, C4, C5, C6, and C7 have been defined above and thus are not redefined here. To determine capacitance C1, as GS1 is selected (connected to Vdd), while GS2, GS3, GS4 are de-selected (connected to Vss (ground)). This causes finger 401 to be in electrical communication with CBCM circuit 451. The capacitance C1 can then be determined by measuring the current Iavg and using Equation 4. To determine capacitance C2, GS3 is selected and GS1, GS2, and GS4 are de-selected. This causes finger 402 to be in electrical communication with CBCM circuit 451. The capacitance C2 can then be determined by measuring the current Iavg and using Equation 4. To determine capacitance C3, GS1 and GS3 are selected and GS2 and GS4 are de-selected. This causes fingers 401 and 402 to be in electrical communication with CBCM circuit 451. The capacitance C3 can then be determined by measuring the current Iavg and using Equation 4. To determine capacitance C4, GS2 is selected and GS1, GS3 and GS4 are de-selected. This causes top plate 403 to be connected to CBCM circuit 451. The capacitance C4 can then be determined by measuring the current Iavg and using Equation 4. To determine capacitance C5, GS1 and GS2 are selected and GS3 and GS4 are de-selected. This causes finger 401 and top plate 403 to be in electrical communication with CBCM circuit 451. The capacitance C3 can then be determined by measuring the current Iavg and using Equation 4. To determine capacitance C6, GS4 is selected and GS1, GS2 and GS3 are de-selected. This causes bottom plate 404 to be in electrical communication with CBCM circuit 451. The capacitance C6 can then be determined by measuring the current Iavg and using Equation 4. To determine capacitance C7, GS1 and GS4 are selected and GS2 and GS3 are de-selected. This causes finger 401 and bottom plate 404 to be in electrical communication with CBCM circuit 451. The capacitance C7 can then be determined by measuring the current Iavg and using Equation 4.

Once capacitances C1, C2, C3, C4, C5, C6, and C7 have been measured, coupling capacitances Ct, Cb and Cc are then calculated using the following Equations 1–3 described above.

Those of ordinary skill in the art will recognize that there are a number of techniques that can be used measure the coupling capacitances Ct, Cb and Cc of the present invention. For example, the techniques described in U.S. Pat. No. 5,999,010 entitled "Method Of Measuring Interconnect Coupling Capacitance In An IC Chip" issued to N. D. Arora can be used. U.S. Pat. No. 5,999,010 is hereby incorporated by reference in its entirety.

Calculation of Coupling Capacitances

Initial coupling capacitances are calculated by inputting the initial process parameters into a field solver (or another mathematical tool that is capable of determining coupling capacitances from the initial process parameters), which is shown as step 120 in FIG. 1. Initial process parameters are the parameters that the integrated circuit designer used when creating the integrated circuit. As mentioned above, initial process parameters typically include the thickness of the interconnect and the width of the interconnect.

Field solvers, which are well known in the art, are software tools that determine the electromagnetic field of metal lines under various boundary conditions by solving Laplace equations. Different types of field solvers use different numerical techniques, such as finite element, finite difference and boundary element methods for converting differential equations into algebraic equations and then solving for the electromagnetic field of the metal lines.

Optimization

After the field solver computes the initial coupling capacitances, the initial coupling capacitances are compared to the measured coupling capacitances, as is seen in steps 130–135 in FIG. 1. If the difference between the initial coupling capacitances and measured coupling capacitances are sufficiently small (i.e., convergence occurs), the system determines that the physical (actual) process parameters are equivalent to the initial process parameters and therefore the system outputs the final process parameters. On the other hand, if the difference between the initial coupling capacitances and measured coupling capacitances are not sufficiently small, the system uses a optimizer to obtain accurate final process parameters. See steps 145–165 of FIG. 1.

The optimizer uses iterative mathematical techniques to create modified process parameters. During each iteration, modified process parameters are input into the field solver. The field solver then computes modified coupling capacitances that are then compared with the measured coupling capacitances. The optimizer recognizes whether the difference between the modified coupling capacitances and the measured coupling capacitances increases or decreases from iteration to iteration. Eventually modified process parameters that are substantially equivalent to the physical (actual) process parameters are obtained by this process. These parameters are then output as the final process parameters.

In one embodiment of the optimizer, a response surface is generated using a field solver. The response surface is a function that relates coupling capacitances to interconnect parameters. The coupling capacitances are described by second-order polynomial equations. The interconnect parameters are then determined from the response surface based on capacitance measurement.

In another embodiment of the optimizer, a lookup table is generated using a field solver. The lookup table consists of coupling capacitances as functions of interconnect parameters. The interconnect parameters are then determined from the table.

In another embodiment of the optimizer, a neural network approach can be used. A set of training data is generated using a field solver, and the network is trained to predict the process parameters based on the capacitance measurements.

In another embodiment of the optimizer, a genetic algorithm can be used. The determination of the interconnect parameters for given measured coupling capacitances are determined using a set of guided stochastic search procedures based on loosely on the principles of genetics.

In another embodiment of the optimizer, a method which capitalizes on the fact that coupling capacitances are proportional to the interconnect parameters (e.g., T, St, Sb, Wt, Wb, Ht, and Hb) is used. This method is described with reference to the following equations:

$$Cc \propto T/S;$$

$$Ci \propto Wi/Hi; \quad i=t,b$$

Assuming constant metal pitch (Wi+Si) and stack height (Ht+T+Hb), the gradients are calculated as:

$$dT = \frac{(1 - C_c - C_0)(4W - 2C_0H)dC_c - 2C_c(C_cW + H - 2C_cC_oH)dC_c}{(2 - C_cC_0)^2}$$

$$dW_i = \frac{-(2C_iW + C_iC_0H - 2C_iC_0C_cW)dC_c - C_iC_c(H - C_cW)dC_c + (2 - C_cC_0)(H - C_cW)dC_i}{(2 - C_cC_0)^2}$$

Here $C0=(Ct+Cb)/2$, $W=Wt+Si$ and $H=Ht+T+Hb$.

The metal pitch W is assumed to be the same as the design pitch. However, due to CMP dishing, the total height H could be larger than the design stack height, and is compensated by $\Delta H$, which can be determined from the coupling capacitance values of the top and bottom plates and the field solver.

In another embodiment of the optimizer, the response surfaces of capacitances are constructed using linear regression. The coupling capacitances, including the capacitance between two sets of fingers Cc, and the capacitance between a finger and the top and bottom plates, respectively, Ct and Cb, are expressed as functions of process parameters including metal thickness t, interlevel dielectrics ("ILD") thickness tt and tb, metal width Wt and Wb, metal spacing St and Sb, intra-layer and inter-layer dielectric constants k1 and k2 (here only two dielectrics are used for simplicity):

$$C_i = C_{i,0} + \delta C; i = c, t, b$$

$$(\delta C_c \quad \delta C_t \quad \delta C_b) = \begin{pmatrix} a_1 & b_1 & c_1 & d_1 & e_1 & f_1 & g_1 & h_1 & l_1 \\ a_2 & b_2 & c_2 & d_2 & e_2 & f_2 & g_2 & h_2 & l_2 \\ a_3 & b_3 & c_3 & d_3 & e_3 & f_3 & g_3 & h_3 & l_3 \end{pmatrix} \times \begin{pmatrix} \delta t \\ \delta t_t \\ \delta t_b \\ \delta W_t \\ \delta W_b \\ \delta S_t \\ \delta S_b \\ \delta k_1 \\ \delta k_2 \end{pmatrix} + \sigma$$

Here the second order terms are ignored, and $\sigma$ is the error term. Correlation parameters a, b, c, d, e, f, g, h, l are determined, using a linear regression method, from multiple coupling capacitance values of $C_c$, $C_t$ and $C_b$ on a set of test structures using design of experiment for various metal widths and spacing. Once all the correlation parameters a, b, c, d, e, f, g, h, l are determined, a response surface of coupling capacitances as functions of physical parameters can then be established. Using the above equations, the process parameters can be solved for any measured coupling capacitances. However, based on sensitivity analysis, the number of correlation parameters could be reduced.

Advantages

The embodiments disclosed herein provide numerous advantages. First and foremost, interconnects having non-ideal shapes, such as copper interconnects having a trapezoidal shapes, can be profiled in a simple, low cost and relatively fast way without destroying wafers. The interconnect process parameters that are obtained include metal line widths, both at the top and the bottom surfaces, as well as the thickness of the metal lines. The ILD thickness of the interconnect system can also be determined. By knowing the discrepancies between initial process parameters and actual process parameters, parasitic extraction or circuit delay simulation can be made more accurate, and the performance of the integrated circuit can be enhanced with less design guard margin. Another advantage is that only conventional probing equipment is needed to take measurements.

Another advantage is that that the measurements can be performed in-line or off-line. In-line means that the wafers are in the process line and off-line means that the wafers are not in the process line. In-line and off-line measurements can be used for process control and yield enhancements. If the measurements are made in-line, the information of the actual (physical) process parameters of the interconnects can be used for process control and yield enhancement.

In-line and off-line measurements can also be used to create accurate models for the interconnect process parameters. As mentioned above, it is crucial that the software design tools used to created integrated circuits accurately model the physical characteristics of the interconnect. Accurate physical modeling significantly increases the chances that a particular design will function properly the first time it is fabricated. Using the embodiments disclosed herein, interconnect process parameters from fabricated wafers can be measured and then input into the software design tools. As such, subsequent designs will be created with physical (actual) process parameters rather than theoretical values.

Yet another advantage of the embodiments disclosed herein is that it enables interconnects designed in the sub-micron range (i.e., less than 100 nm) to be measured.

ALTERNATIVE EMBODIMENTS

Thus, various embodiments disclosed herein have been described with reference to specific embodiments. It will, however, be evident that various modifications and changes may be made thereto without departing from the broader spirit and scope of the disclosure. For example, the reader is to understand that the specific ordering and combination of process actions shown in the process flow diagrams described herein is merely illustrative, and the invention can be performed using different or additional process actions, or a different combination or ordering of process actions. The specification and drawings are, accordingly, to be regarded in an illustrative rather than restrictive sense, and the invention is not to be restricted or limited except in accordance with the following claims and their legal equivalents. Those of skill in the art will recognize that a wide variety of test structures can be used, that different mathematical techniques in place of the field solver, that different passive and active techniques can be used to measure the coupling capacitances, and that different optimization methods can be used to determine the final process parameters. Those of skill in the art will also recognize that the embodiments disclosed herein can be used to measure interconnects having any non-ideal shape, including interconnects having a top surface whose width is less than the width of its bottom surface. Finally, it should be recognized that the measurement technique described herein can apply to interconnects made of any conductive material.

We claim:

1. A method for determining process parameters of an integrated circuit interconnect using a test structure, the test structure comprising a first plate, a second plate, a first conductor disposed between the first plate and the second plate, and a second conductor disposed between the first plate and the second plate, the method comprising:

determining a first set of coupling capacitance associated with a the test structure comprising:

determining a first capacitance between the first plate and the first conductor or the second conductor;

determining a second capacitance between the second plate and the first conductor or the second conductor, wherein the first capacitance and the second capacitance are determined separately;

calculating a second set of coupling capacitance associated with the test structure; and determining the process parameters of the integrated circuit using the first set of coupling capacitances and the second set of coupling capacitances.

2. The method of claim 1 wherein calculating a second set of coupling capacitances associated with the test structure comprises:

inputting initial process parameters into a field solver; and calculating the second set of coupling capacitances using the field solver.

3. The method of claim 1 wherein determining the process parameters of the integrated circuit using the first set of coupling capacitances and the second set of coupling capacitances comprises:

comparing the first set of coupling capacitances with the second set of coupling capacitances; and when the difference between the first set of coupling capacitances and the second set of coupling capacitances are less than a predetermined value, determining that the physical process parameters are equivalent to initial process parameters.

4. The method of claim 1 wherein determining the process parameters of the integrated circuit using the first set of coupling capacitances and the second set of coupling capacitances comprises:

comparing the first set of coupling capacitances with the second set of coupling capacitances; and when the difference between the first set of coupling capacitances and the second set of coupling capacitances are more than a predetermined value, generating modified process parameters.

5. The method of claim 1 wherein determining a first set of coupling capacitance associated with a the test structure comprises:

determining a third capacitance between the first conductor and the second conductor.

6. The method of claim 5 wherein the first plate, the second plate, the first conductor and the second conductor are made of copper.

7. The method of claim 1 wherein the test structure is made of copper.

8. The method of claim 1 wherein the test structure is in electrical communication with a charge-based capacitance measurement (CBCM) circuit.

9. The method of claim 1 wherein a cross-section of the test structure is non-rectangular.

10. A method for determining coupling capacitances of a test structure within an integrated circuit, the test structure comprising a first plate, a second plate, a first conductor disposed between the first plate and the second plate, and a second conductor disposed between the first plate and the second plate, the method comprising:

determining a first capacitance between the first plate and the first conductor or the second conductor;

determining a second capacitance between the second plate and the first conductor or the second conductor, wherein the first capacitance and second capacitance are determined separately; and determining a third capacitance between the first conductor and the second conductor.

11. The method of claim 10 wherein the first plate, the first conductor, the second conductor, and the second plate are made of copper.

12. The method of claim 10 wherein the shapes of the first conductor and the second conductor are symmetrical.

13. The method of claim 10 wherein both the first conductor and the second conductor have a comb shape.

14. The method of claim 10 wherein both the first conductor and the second conductor have a maze shape.

15. The method of claim 10 wherein both the first conductor and the second conductor have a serpentine shape.

16. The method of claim 10 wherein both the first plate and the second plate are solid plates.

17. The method of claim 10 wherein both the first pate and the second plate are Of slotted plates.

18. The method of claim 10 wherein first plate is in electrical communication with a first probe pad, the first conductor is in electrical communication with a second probe pad, the second conductor is in electrical communication with a third probe pad, and the second plate is in electrical communication with a fourth probe pad.

19. The method of claim 10 wherein the first plate is in electrical communication with a first multiplexer, the first conductor is in electrical communication with a second multiplexer, the second conductor is in electrical communication with a third multiplexer, and the second plate is in electrical communication with a fourth multiplexer and wherein the first plate, the first multiplexer, the first conductor, the second multiplexer, the second conductor, the third multiplexer, the second plate, and the fourth multiplexer are contained within a single integrated circuit.

20. The method of claim 10 wherein a cross-section of the first conductor is non-rectangular and a cross-section of the second conductor is non-rectangular.

21. The integrated circuit of claim 10, wherein the first capacitance and the second capacitance are determine separately based on capacitance measurements of a single test structure.

22. An integrated circuit including at least one test structure, the test structure comprising:

a first conductive plate;

a second conductive plate;

a first conductor located between the first conductive plate and the second conductive plate;

a second conductor located between the first conductive plate and the second conductive plate;

a current measurement circuit in electrical communication with the first conductive plate, the second conductive plate, the first conductor, and the second conductor;

a first multiplexer circuit connected to the first conductive plate;

a second multiplexer circuit connected to the second conductive plate; and a CBCM circuit connected to the first multiplexer circuit and the second multiplexer circuit.

23. The integrated circuit of claim 22 wherein the first conductive plate, the first conductor, the second conductor, and the second conductive plate are made of copper.

24. The integrated circuit of claim 22 wherein the shapes of the first conductor and the second conductor are symmetrical.

25. The integrated circuit of claim 22 wherein both the first conductor and the second conductor have a comb shape.

26. The integrated circuit of claim 22 wherein both the first conductor and the second conductor have a maze shape.

27. The integrated circuit of claim 22 wherein both the first conductor and the second conductor have a serpentine shape.

28. The integrated circuit of claim 22 wherein both the first conductive plate and the second conductive plate are solid plates.

29. The integrated circuit of claim 22 wherein both the first conductive plate and the second conductive plate are slotted plates.

30. The integrated circuit of claim 22 wherein a cross-section of the first conductor is non-rectangular and a cross-section of the second conductor is non-rectangular.

31. A method for determining coupling capacitances of a test structure within an integrated circuit, the test structure comprising a first plate, a second plate, a first conductor disposed between the first plate and the second plate, and a second conductor disposed between the first plate and the second plate, the method comprising:

determining a first capacitance between the first plate and the first conductor or the second conductor;

determining a second capacitance between the second plate and the first conductor or the second conductor; and determining a third capacitance between the first conductor and the second conductor, wherein the first plate is in electrical communication with a first multiplexer, the first conductor is in electrical communication with a second multiplexer, the second conductor is in electrical communication with a third multiplexer, and the second plate is in electrical communication with a fourth multiplexer and wherein the first plate, the first multiplexer, the first conductor, the second multiplexer, the second conductor, the third multiplexer, the second plate, and the fourth multiplexer are contained within a single integrated circuit.

* * * * *